US012631037B2

(12) United States Patent 
Lancry et al.

(10) Patent No.: US 12,631,037 B2 
(45) Date of Patent: May 19, 2026

(54) WIRELESS AUTOMATIC SWIMMING POOL CLEANERS AND ASSOCIATED SYSTEMS AND METHODS

(71) Applicant: ZODIAC POOL CARE EUROPE, Belberaud (FR)

(72) Inventors: Arnaud Lancry, Le Vernet (FR); Simon Duffaut, Castelginest (FR); Louis Favie, Colomiers (FR); Mehdi Chafik, Tournefeuille (FR); Remi Deloche, Toulouse (FR); Arnaud Besnier, Beaupuy (FR)

(73) Assignee: ZODIAC POOL CARE EUROPE, Belberaud (FR)

( * ) Notice: Subject to any disclaimer, the term of this patent is extended or adjusted under 35 U.S.C. 154(b) by 757 days.

(21) Appl. No.: 17/677,364

(22) Filed: Feb. 22, 2022

(65) Prior Publication Data

US 2022/0268045 A1 Aug. 25, 2022

Related U.S. Application Data

(60) Provisional application No. 63/152,444, filed on Feb. 23, 2021.

(51) Int. Cl.

| | |
|---|---|
| *E04H 4/16* | (2006.01) |
| *H04L 67/125* | (2022.01) |
| *H04W 4/38* | (2018.01) |

(52) U.S. Cl. 
CPC ......... *E04H 4/1654* (2013.01); *H04L 67/125* (2013.01); *H04W 4/38* (2018.02)

(58) Field of Classification Search 
CPC ....... E04H 4/1654; H04L 67/125; H04W 4/38 
See application file for complete search history.

(56) References Cited

U.S. PATENT DOCUMENTS

| | | | |
|---|---|---|---|
| 10,294,686 B1 | 5/2019 | Erlich et al. | |
| 10,683,675 B2 | 6/2020 | Walsh et al. | |
| 11,699,146 B2 * | 7/2023 | Belleville .......... | G06Q 20/3672 |
| | | | 705/41 |
| 2004/0025268 A1 | 2/2004 | Porat et al. | |
| 2006/0102532 A1 | 5/2006 | Cadotte | |

(Continued)

FOREIGN PATENT DOCUMENTS

| | | |
|---|---|---|
| EP | 1122382 | 8/2001 |
| WO | 2013160628 | 10/2013 |

OTHER PUBLICATIONS

International Application No. PCT/IB2022/051555, International Search Report and Written Opinion mailed on Jul. 11, 2022, 20 pages.

(Continued)

*Primary Examiner* — Amine Benlagsir 
(74) *Attorney, Agent, or Firm* — Kilpatrick Townsend & Stockton LLP

(57) ABSTRACT

Concepts relating to automatic swimming pool cleaners (APCs) are detailed. Some concepts may involve communication with APCs either in or out of the water of swimming pools or spas, while other concepts may concern battery charging or management or other operational aspects of cleaner usage in a pool or spa, among others. Many of the concepts may be applicable to avoid need for a robotic APC to be wired to an external control device.

20 Claims, 5 Drawing Sheets

(56) References Cited

U.S. PATENT DOCUMENTS

| | | | | |
|---|---|---|---|---|
| 2006/0287697 A1* | 12/2006 | Lennox | A61F 7/0085 | |
| | | | 607/104 | |
| 2011/0164375 A1* | 7/2011 | Hayashida | G06F 1/1632 | |
| | | | 361/679.41 | |
| 2014/0303810 A1 | 10/2014 | van der Meijden et al. | | |
| 2016/0080913 A1* | 3/2016 | Thogersen | G08G 99/00 | |
| | | | 455/456.3 | |
| 2017/0043966 A1* | 2/2017 | Witelson | G05D 1/0225 | |
| 2018/0135325 A1 | 5/2018 | Schloss et al. | | |
| 2018/0233941 A1* | 8/2018 | Zhang | H02J 50/10 | |
| 2019/0059580 A1* | 2/2019 | Chen | A47B 57/545 | |
| 2019/0338546 A1* | 11/2019 | Witelson | E04H 4/1654 | |
| 2020/0001723 A1* | 1/2020 | Durvasula | B60L 53/14 | |
| 2020/0056391 A1* | 2/2020 | Lancry | B25J 11/0085 | |
| 2020/0343747 A1* | 10/2020 | Cordes | H04M 1/04 | |
| 2021/0072801 A1* | 3/2021 | Leopold | H05K 7/026 | |
| 2021/0263074 A1* | 8/2021 | Rinder | G01R 1/06788 | |
| 2024/0085950 A1* | 3/2024 | Xiao | G06F 13/385 | |

OTHER PUBLICATIONS

International Application No. PCT/IB2022/051555, International Preliminary Report on Patentability mailed on Sep. 7, 2023, 14 pages.
International Application No. PCT/IB2022/051555, Invitation to Pay Additional Fees and, Where Applicable, Protest Fee mailed on May 16, 2022, 15 pages.

* cited by examiner

WIRELESS AUTOMATIC SWIMMING POOL CLEANERS AND ASSOCIATED SYSTEMS AND METHODS

REFERENCE TO RELATED APPLICATION

This application claims the benefit of U.S. Provisional Patent Application No. 63/152,444, filed on Feb. 23, 2021 and entitled COMMUNICATION AND OTHER CONCEPTS RELATING TO AUTOMATIC SWIMMING POOL CLEANERS, the content of which is hereby incorporated by reference in its entirety.

FIELD OF THE INVENTION

This invention relates to concepts, systems, and apparatus for cleaning water-containing vessels such as swimming pools and spas and more particularly, although not necessarily exclusively, to improvements to robotic automatic swimming pool cleaners (APCs).

BACKGROUND

Numerous cleaning devices capable of autonomous movement within swimming pools and spas currently exist. The most common of these devices are APCs, which often are either hydraulic or robotic in type. Hydraulic cleaners vary water flow for movement, while robotic cleaners typically employ electric motors to cause motion. Hydraulic APCs, furthermore, subdivide into "pressure-side" and "suction-side" cleaners, with pressure-side cleaners being fluidly connected to outputs of pumps of pool water circulation systems and suction-side cleaners being fluidly connected to inputs of such pumps.

Conventionally, hydraulic APCs have lacked both electrical power and transceivers and thus have not communicated electronically with any devices. U.S. Patent Application Publication No. 2014/0303810 of van der Meijden, et al. discusses equipping a hydraulic APC with both an on-board electricity generator and a transceiver for the purpose of communicating wirelessly with, e.g., a hand-held device external to a swimming pool. Such communication often remains difficult, however, when the APC is operating in deeper water of a pool, as travel of most radio frequency (RF) signals through water is limited.

At least some robotic APCs have long included on-board means for communicating electronically with devices external to swimming pools. Detailed in European Patent Application Publication No. 1122382 of Clementi, for example, is a robot capable of communicating with a "feeding source" floating within a pool. The communication occurs via cable, however, reflecting the RF-transmission difficulties mentioned above. The floating source, by contrast, may receive wireless signals from "a radio control transmitter held by an operator on an edge of the swimming pool." See Clementi, col. 2, (numeral omitted).

International Patent Application Publication No. WO 2013/160628 of Michelon discloses another robotic APC that as illustrated communicates, via a wired connection, to a "modification device" outside the pool. Like the feeding source of the Clementi application, the modification box of the Michelon application may receive "wireless request signals" from a transmitter outside the pool, with the request signals overriding control signals received at the modification box via a wired connection to a control unit.

The entire contents of each of the van der Meijden, Clementi, and Michelon application are incorporated herein by this reference. Absent from disclosures of these applications is the desirability of equipping robotic APCs with means to communicate wirelessly (including by RF signals) directly with devices external to pools. So equipping robotic APCs would avoid need for the wired "feeding source" of the Clementi application and the wired "modification device" of Michelon application, simplifying the structure of the overall communication system.

SUMMARY

Embodiments covered by this patent are defined by the claims below, not this summary. This summary is a high-level overview of various embodiments and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to some embodiments, an APC includes a body and an antenna on, in, or attached to the body and, using the antenna, is configured to communicate wirelessly with a device external to a swimming pool.

In various embodiments, an APC may be configured to communicate wirelessly with a device external to a swimming pool while the APC is operating at or near a waterline of the swimming pool.

According to certain embodiments, a method of causing automatic movement of an APC includes (i) submerging the APC in water of a swimming pool and (ii) contacting the APC with an object, the contact causing the APC to initiate a cleaning cycle, a retrieval activity or any other action of the ACP.

According to various embodiments, an APC includes an on-board battery that may switch between operational modes including (a) an idle mode, (b) an off mode, and (c) a normal mode. In some cases, the idle mode allows the APC to receive certain electronic or mechanical information, and the off mode interrupts supply of electricity from the on-board battery to other components of the APC.

According to some embodiments, an APC includes a system for managing charging of its on-board battery.

In various embodiments, an APC includes a system for managing its activities based on an extent to which an on-board battery is charged.

A charging system for an APC may include a charging base configured for use externally of a swimming pool and including means for connection to the APC. Optionally, the charging system includes a trolley to which the charging base is attached, into which the charging base is integrated, or onto which the charging base is positioned.

According to certain embodiments, an APC includes a body, an antenna enabling a first type of non-wired communication between the APC with a device external to a swimming pool, and a sensor enabling a second type of non-wired communication with the APC different from the first type of non-wired communication.

In various embodiments, a method of controlling a wireless APC includes sensing contact of an object with the APC and controlling the APC based on the sensed contact.

According to some embodiments, an APC includes a body and an on-board battery that selectively supplies electricity to a plurality of components of the APC. The on-board battery may be operable in a plurality of operational modes.

In certain cases, the operational modes include a normal operational mode, an off operational mode interrupting the supply of electricity from the on-board battery to the plurality of components of the APC, and an idle mode allowing the supply of electricity to at a first component of the plurality of components and interrupting the supply of electricity to at least a second component of the plurality of components.

According to various embodiments, an APC includes an on-board battery and a charging control system for controlling charging of the on-board battery.

In certain embodiments, an APC includes an on-board battery and a control system for controlling activities of the APC based on a charge level of the on-board battery.

A charging system for an APC may include a charging base and a flexible electrical contact for contacting the APC where the flexible electrical contact is movable relative to the charging base.

According to some embodiments, a charging system for an APC includes a charging base for at least partially supporting the APC and means for making an electrical connection with the APC.

Various implementations described herein may include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The specification makes reference to the following appended figures, in which use of like reference numerals in different figures is intended to illustrate like or analogous components.

DETAILED DESCRIPTION

The subject matter of embodiments is described herein with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "up," "down," "top," "bottom," "left," "right," "front," and "back," among others, are intended to refer to the orientation as illustrated and described in the figure (or figures) to which the components and directions are referencing; however, such direction references or identifies should not be considered limiting. References to "pools" and "swimming pools" herein may also refer to spas or other water containing vessels used for recreation or therapy and for which cleaning of debris is needed or desired.

Described herein are systems, apparatuses, and methods of communicating with robotic APCs both while such APCs are operating in swimming pools and spas and while removed from the pools. In some embodiments, the systems and methods described herein provide robotic APCs configured to perform certain actions at certain times and/or in certain sequences, for example, when prompted to do so mechanically (and/or otherwise without wireless electronic communication), and/or when a characteristic of the cleaner, the water of the pool, and/or the ambient environment is sensed. In some embodiments, the systems, apparatuses, and methods described herein may additionally or alternatively provide improved charging of on-board power sources of APCs, such as improved charging of on-board batteries of APCs. In certain embodiments, information relating to battery charge or another state of the battery optionally may be used to control one or more operational actions of an APC. Various other benefits and advantages may be realized with the systems and methods provided herein, and the aforementioned advantages should not be considered limiting.

Figure 1:
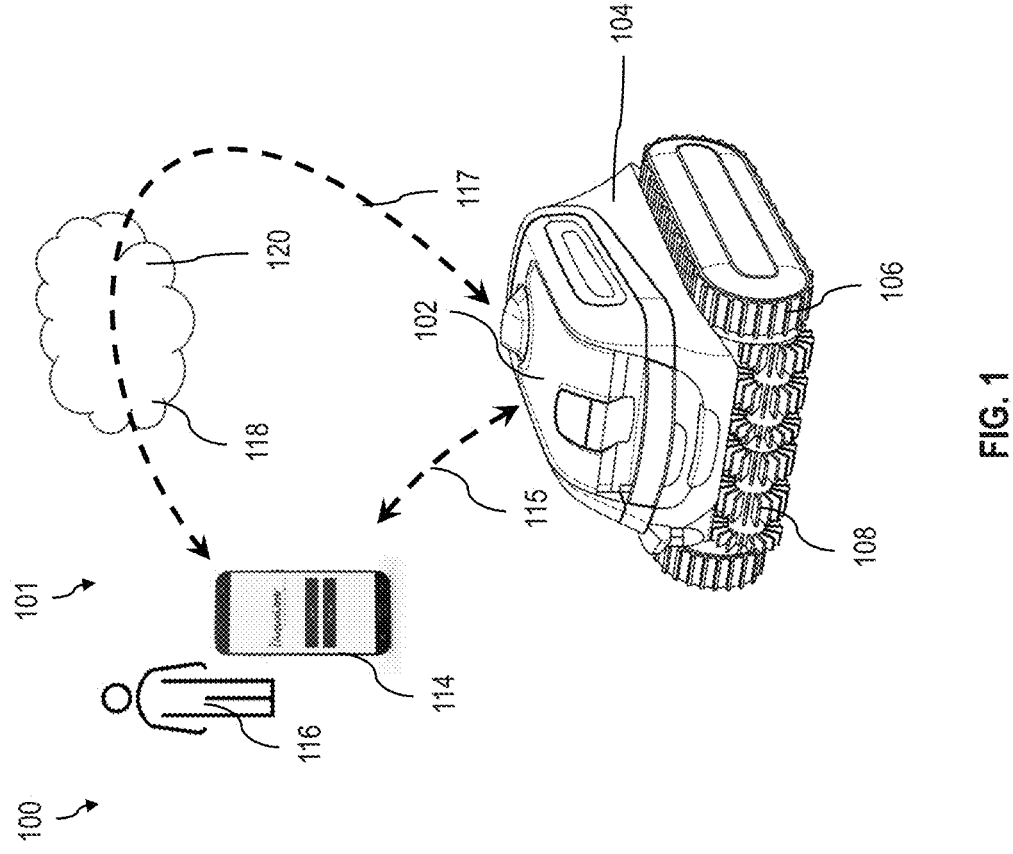
FIG. 1 illustrates an APC in an expanded communication environment according to embodiments.
Figure 2:
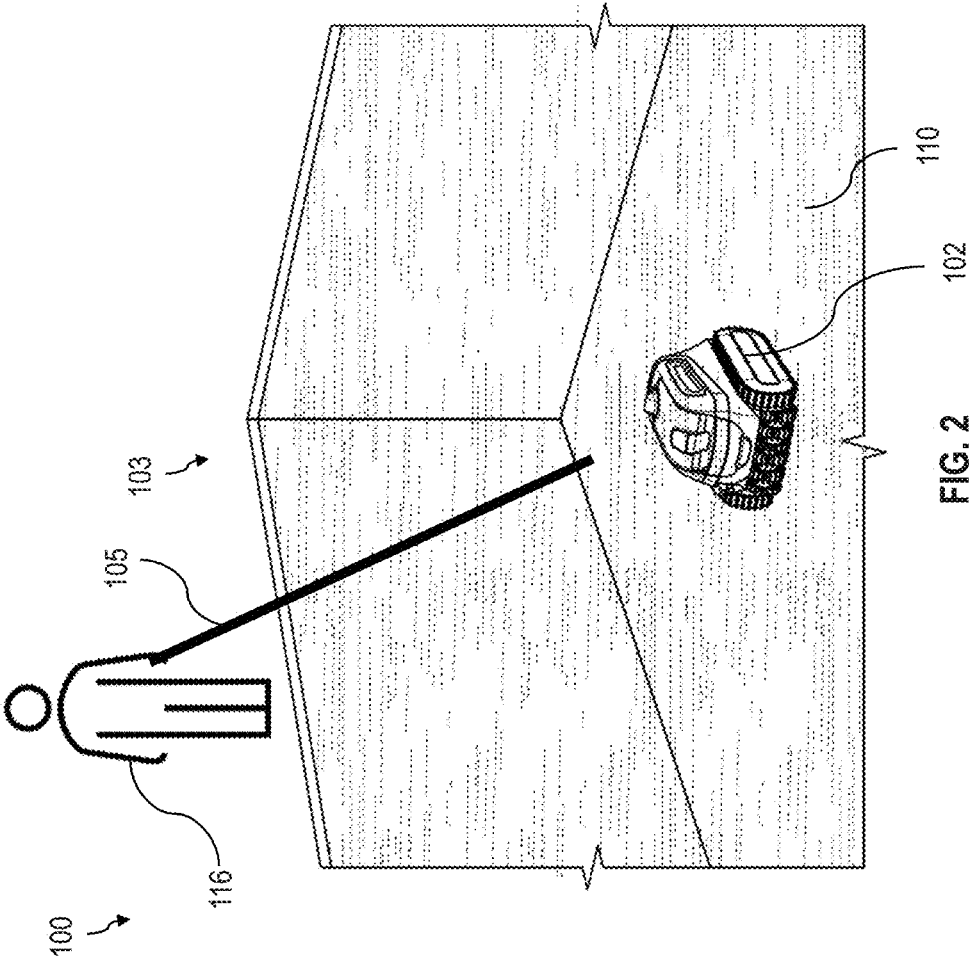
FIG. 2 illustrates the APC of FIG. 2 in a limited communication environment according to embodiments.

FIGS. 1 and 2 illustrate a pool system 100 with an APC 102 according to various embodiments. The APC 102 may be various types of APCs as desired, including robotic and hydraulic APCs, which may be suitable for use with a pool 110 (see FIG. 2). The APC 102 generally includes a body 104, motive elements 106, and one or more cleaning elements 108. The motive elements 106 may be various suitable devices or structures suitable for enabling movement of the APC 102 along a surface, including but not limited to wheels, rollers, feet, tracks, combinations thereof, and/or other suitable motive elements 106 as desired. The cleaning element 108 may be suitable devices for cleaning a surface and/or directing debris into the APC 102 and/or towards a filter of the APC 102, including but not limited to a brush assembly with one or more brushes. The APC 102 may additionally or alternatively include one or more of a pump, a debris filter, a rechargeable, on-board battery (or other suitable power source), and/or one or more motors for operating the pump and motive elements. In certain embodiments, the body 104 of APC 102 may include at least one inlet for debris-laden water of the pool 110 and at least one outlet for filtered water to be exhausted back into the pool 110.

Means for sensing and/or receiving one or more inputs may also be provided on the APC 102, including but not limited to various sensors, antennas, communication modules, user interfaces and/or other mechanisms as desired. In various embodiments, the APC 102 includes one or more communication modules, which may be various systems and mechanisms enabling wireless communication (e.g., near field, radio, cellular, Wi-Fi, Bluetooth®, Bluetooth Low Energy (BLE), etc.). In certain embodiments, and as discussed in detail below, the APC 102 includes at least two types of non-wired communication systems.

In some embodiments, the APC 102 includes a controller, which may include at least one processor and/or at least one memory and/or be various suitable types of computing devices or systems. In certain embodiments, the controller may be communicatively coupled with various components of the APC 102 and may selectively control features of the APC 102 as desired and as discussed in detail below.

The APC 102 may include various other components or features as desired, and the aforementioned examples should not be considered limiting.

APC Communication

Referring to FIGS. 1 and 2, the APC 102 may generally be provided or operated in two types of environments or positions—one in which the APC 102 can send and/or receive wireless signals (referred to herein as "expanded communication environments"), and one in which wireless communication is compromised and/or otherwise not possible (referred to herein as "limited communication environments"). In certain embodiments, the APC 102 may be operable to have two-way communication (e.g., send and receive communications) in at least the expanded communication environments, and in some embodiments, the APC 102 optionally may have two-way communication in a limited communication environment. Examples of the expanded communication environments include when the APC 102 is out of the water of the pool 110, at the waterline of the pool 110, in shallow water of the pool 110, and/or otherwise when the antenna is out of, at, or near the water surface. Examples of limited communication environments include when the APC 102 is submerged within the pool 110 (e.g., RF signals are unable to be sent once the APC 102 is at least a certain depth within the pool 110). FIG. 1 illustrates the APC 102 in an expanded communication environment 101 (e.g., out of the pool) and FIG. 2 illustrates the APC 102 in a limited communication environment 103.

Regardless of whether the APC 102 is in an expanded communication environment 101 or a limited communication environment 103, communication with the APC 102 may still be desirable and/or needed. In some embodiments, the APC 102 may include at least two communication modules or systems enabling two types of non-wired communication. In certain embodiments, a first communication module of the at least two communication modules enables non-wired communication with the APC 102 at least while the APC 102 is in the expanded communication environment 101, and a second communication module of the at least two communication modules enables non-wired communication with the APC 102 while the APC 102 is in the limited communication environment 103. In one non-limiting example, the first communication module may support a wireless communication protocol (e.g., includes an antenna supporting RF, Wi-Fi, or Bluetooth®) and the second communication module may enable communication with the APC 102 via contact, magnetic fields, and/or other sensed conditions by the APC 102.

FIG. 1 illustrates an example where the first communication module of the APC 102 is a wireless communication module, and FIG. 2 illustrates an example where the second communication module of the APC 102 supports communication by sensing contact or touching of the APC 102, such as from the user 116 contacting the APC 102 with an object 105 or otherwise.

Referring to FIG. 1, in expanded communication environments 101 the APC 102 may wirelessly communicate (e.g., using RF signals and/or other communication protocols) with an external device 114 of a user 116 such as a smartphone, tablet, and/or other electronic device external to the pool 110. Such communication may be direct (represented by arrow 115) and/or indirect (represented by arrow 117) using an intermediary system or device 118 such as via the Internet, a cloud server 120, and/or another network or intermediary equipment as desired. In either case, no wired connection between APC 102 and either a "feeding source" or a "modification device" is necessarily needed, however.

The APC 102 may perform various wireless communication-related activities in the expanded communication environment 101. In some optional embodiments, the communication module of the APC 102 may include an antenna and transceiver. In such embodiments, the APC 102 may communicate information to a user or other person or device when it is at the waterline of the pool 110, in shallow water of the pool, and/or otherwise when the antenna is out of, at, or near the water surface. As mentioned, in other embodiments, the APC 102 may include communication modules enabling various other types of communication, and communication may be performed in other manners if non-RF signals are employed.

As one non-limiting example of communication activities in the expanded communication environment 101, the APC 102 may be operable to have two-way communication with various devices (e.g., send information and receive information). As an example, the APC 102 may communicate and/or receive various information to a user of the external device 114 through a wireless communication protocol such as, but not limited to, RF, Wi-Fi, or Bluetooth®. In such embodiments, the communication module on the APC 102 may include various systems or mechanisms enabling such wireless communication. The information communicated by the APC 102 may be various types of information as desired, including but not limited to information about the APC 102, sub-systems or components of the APC 102, information about the pool 110, combinations thereof, and/or other information as desired. In some embodiment, the APC 102 may also receive information or instructions from the external device 114 through a wireless communication protocol.

As another non-limiting example, the APC 102 may communicate information to a user or other person or the device 114 concerning a status or characteristic of an on-board battery including, for example, its presence or absence in the APC 102, its load, if the battery has a short circuit, the extent to which it is charged, etc. As a further non-limiting example, the APC 102 may communicate information to a user or other person or the device 114 about its status—e.g. whether it is or is not docked, whether it is charging or charged, whether it is in operational or an error state, etc. As an additional non-limiting example, the APC 102 may communicate to a user or other person or device 114 reports, information, and/or statistical analysis relating to prior pool cleaning cycles. Additionally or alternatively, the APC 102 may wirelessly communicate with one or more external devices or systems for performing various support or maintenance actions. As a non-limiting example, firmware on-board the APC 102 may be updated wirelessly by, e.g., the cloud server 120, an application ("app") or other program executable by the device 114, and/or as otherwise desired.

Various other types of information may be wirelessly communicated by the APC 102 to the device 114 (or received by the APC 102 from the device 114) in the expanded communication environment 101 as desired, and the aforementioned examples should not be considered limiting.

In some embodiments, communication of information about the APC 102 may be provided using the device 114 even though the APC 102 itself is not connected and/or in the water of the pool 110. As one non-limiting example, information about the APC 102 may be stored on the intermediary system or device 118 (e.g., the cloud server 120) and/or a memory of the device 114, and such stored information may be communicated to the user 116 of the device 114.

As another non-limiting example, the device 114 or an app operating on the device 114 may be synchronized with the APC 102 while the APC 102 is in an expanded communication environment 101, and the device 114 or app may communicate information to the user 116 by predicting or estimating information about the APC 102 based on the initial synchronization. As a non-limiting example, the device 114 may notify a user or other person or other device of an expected duration of a cleaning cycle of APC 102 within the pool 110 and/or when the cleaning cycle of APC 102 within the pool 110 is (or is predicted to be) complete, such as (but not limited to) by synchronizing a start time of the cycle on both APC 102 and the device 114 and then performing a countdown. Synchronization may be performed using various techniques as desired. As one non-limiting example, synchronization may (but need not necessarily) occur through a user action such as, but not limited, to pressing a physical button or a virtual button on the device 114. Additionally or alternatively, synchronization may occur using accelerometric sensing on-board APC 102 and/or using other types of sensors on the APC 102 as desired.

As another non-limiting example, the device 114 may notify a user or other person or other device of the length of time elapsed since an on-board battery of APC 102 has been charged. Such communication optionally may be performed when the time of the most recent battery charging is stored in memory of the device 114 and/or on the cloud server 120 or other intermediary devices 118.

Various other types of information about the APC 102 may be communicated using the device 114 as desired, and the aforementioned examples should not be considered limiting.

Referring to FIG. 2, in the limited communication environments 103, one or more control inputs may be communicated to the APC 102 while the APC 102 is in the limited communication environment 103. In these embodiments, the APC 102 may utilize the second communication module supporting the second type of non-wired communication. In the embodiment of FIG. 2, the second communication module enables communication with the APC 102 based on contact or touching that is sensed by the APC 102. Such contact may be made, for example, by the object 105 contacting the APC 102. In other embodiments, the second communication module may support other types of communication as desired. As a non-limiting example, the second communication module may support magnetic communication, or communication based on sensed magnetic fields, and/or various other types of mechanical and/or non-electrical communication as desired. Such non-electrical communication with the APC 102 may be used to cause any action in the APC 102 as desired. As some non-limiting examples, non-electrical communication such as tapping and/or magnetic fields may be used to start the APC 102, stop the APC 102, change a direction of the APC 102, cause the APC 102 to present itself for retrieval from the pool 110, and/or as otherwise desired. Optionally, in addition to receiving communications in the limited communication environment, the APC 102 may transmit information in the limited communication environment using various non-wireless techniques as desired, including but not limited to light-based communication, sound-based communication, movement-based communication, combinations thereof, and/or other communication as desired and/or suitable for the limited communication environment. In this manner, similar to the expanded communication, the APC 102 in the limited communication environment may support two-way communication (e.g., send and receive information).

Optionally, the APC 102 may include a human-machine interface (HMI) configured to provide certain information to a user or other person. Via an app or other executable program on the device 114, other information may be provided by APC 102 to a user or other person or device. Such information may include, but is not necessarily limited to, a battery charge level (e.g., percentage), an estimated time when a cleaning cycle will end, an estimated time when battery charging will end, a time remaining before a cleaning cycle will end, a time remaining before the battery charge will be depleted, a time remaining before battery charging will end, a battery health, as exemplified by information such as cycle numbers, remaining capacity, voltages, and currents, and/or reduction in cycle time according to remaining battery capacity. Other types of information and/or the information in other formats may be provided to the user as desired.

APC Control

The APC 102 may be controlled and/or may automatically control itself to perform various activities as desired (e.g., starting a cleaning cycle, stopping a cleaning cycle, moving, managing a power supply to various sub-components of the APC 102, managing charging of the APC 102, etc.). Examples of various controlled activities for the APC 102 are discussed in detail below, but the following examples should not be considered limiting.

In one non-limiting example, a controlled activity performed by the APC 102 may include one or more stages of a lift cycle in which the APC 102 presents itself for retrieval from the pool 110. Stages of the lift cycle optionally may include (i) providing the command to the APC 102, (ii) orienting the APC 102 within the pool 110, (iii) climbing of the wall by the APC 102, and (iv) waiting at or near the waterline. Conventionally, the user 116 may initiate these presentations by initiating a command sent to the APC 102 via a wire from the "modification device." However, as mentioned, APCs 102 according to embodiments of the disclosure may omit wires/wired connections.

In some embodiments, when the APC 102 is in the expanded communication environment 101, a control input for performing one or more stages of the lift cycle may be sent wirelessly and/or using other communication techniques as previously discussed. In various embodiments, the robotic APC 102 may be programmed under certain conditions to present itself at the pool waterline for retrieval by a user 116 or other person and removal from the pool. In some examples, the APC 102 may remain at the pool waterline by continuing to operate its motors as necessary and/or, if APC 102 is buoyant when inoperative, by floating on the water surface. As another non-limiting example, the APC 102 may be programmed and/or controlled by the controller such that the APC 102 finishes its cleaning cycle near a particular structure of the pool 110 to facilitate retrieval. An example may be controlling the APC 102 such that it finishes its cleaning cycle near a wall of the pool 110 rather than a center of the pool 110, which may facilitate access for a user.

In certain embodiments, particularly when the APC 102 is in the limited communication environment 103 and unable to receive a command signal via wireless communication, the APC 102 may self-initiate the lift cycle. As one non-limiting example, the APC 102 may sense when it has completed a cleaning cycle within the pool 110 using various techniques or mechanisms including, but not limited to, using sensors measuring conditions of the pool 110, sensors measuring conditions of the APC 102, a clock or count utilized by the controller of the APC 102, and/or based on a predetermined time (selected by the user or otherwise) having elapsed. Other sensing techniques or mechanisms may be utilized as desired to sense a completion of the cleaning cycle by the APC 102. In such cases of the self-initiated lift cycle, based on the determination by the APC 102 that a cleaning cycle is complete, the APC 102 may remain at the pool waterline by continuing to operate its motors as necessary and/or, if APC 102 is buoyant when inoperative, by floating on the water surface. As another non-limiting example of a self-initiated lift cycle, the APC 102 may be programmed and/or controlled by the controller such that the APC 102 finishes its cleaning cycle near a particular structure of the pool 110 to facilitate retrieval. An example is the APC 102 finishing its cleaning cycle near a wall of the pool 110 rather than a center of the pool 110, which may facilitate access for a user.

Alternatively or additionally, a command to start and/or end the lift cycle may be provided to the APC 102 via any aforementioned non-electrical communications, including but not limited to mechanical communication, physical communication, magnetic communication, combinations thereof, and/or other suitable non-electrical communication as desired. As one non-limiting example, a user or other person may mechanically initiate the lift cycle by, for example, tapping or otherwise contacting APC 102 with a rod or other object 105. The APC 102 may recognize the contact (and/or vibrations from such contact) as intended to constitute a command to start a lift cycle.

As further examples, the orientation of the lift cycle may be predetermined by a user or other person and implemented using a compass or other sensor within the APC 102. Alternatively, the APC 102 itself may orient its body during a specific phase of the cleaning cycle, based on a particular characteristic of the tapping or contact (e.g., location, pattern, etc.), and/or otherwise as appropriate.

In another non-limiting example, a controlled activity may include initiation of a cleaning cycle for the APC 102. In some embodiments, cleaning cycle initiation may automatically occur when a sensor of APC 102 senses that the cleaner is immersed in water, is a predetermined depth within the pool 110, and/or has dropped to the bottom or floor of the pool, as examples. Alternatively or additionally, a user or other person may mechanically initiate the cleaning cycle by, for example, tapping or otherwise contacting APC 102 with a rod or other object, with a sensor of the APC 102 recognizing the contact and/or vibrations from such contact as intended to constitute a command to initiate cleaning (e.g., based on a location, pattern, etc. of the contact or vibrations).

Whether communicative or not, as previously mentioned, in certain embodiments, the APC 102 may be powered by a rechargeable, on-board battery. In such embodiments, the battery of the APC 102 may require at least occasional recharging of the battery. In such embodiments, one or more controlled activities may include one or more power control activities such as, but not limited to, managing power usage, managing battery charging, managing performance based on energy levels, etc.

As one non-limiting example, the APC 102 may be operable in various modes for controlling power usage and/or potentially increasing (or otherwise controlling) the time between battery recharges. Such control of the APC 102 to be in the various modes may be performed by the controller of the APC 102, a controller specific for the battery, a user, the device 114, and/or as otherwise desired.

In certain embodiments, the APC 102 may include at least three different modes: an idle mode, an off mode, and a charging mode. In these examples, the idle mode may be an energy-saving mode in which certain systems or features of the APC 102 are activated and others are deactivated or in a low power state. As a non-limiting example, in the idle mode, the APC 102 may maintain a level of power to its communication module such that the APC 102 may receive certain commands (such as a "wake-up" command) or information, but the controller of the APC 102 otherwise de-energizes many components to reduce energy consumption. The off mode of the APC 102 may be a mode that maximizes energy savings by interrupting the power supplied by the on-board battery (i.e. decreasing the electrical load on the battery to zero). The normal mode may be an operating mode in which most or all components of APC 102 are energized for regular operation. In other embodiments, additional operating modes for controlling battery usage may be utilized as desired.

In embodiments with a plurality of operating modes, mode-changing commands (e.g., wake-up commands from Idle to Normal) may be supplied to the APC 102 via electrical communication (e.g., from the external device 114) or non-electrical communication such as tapping and/or magnetic fields, and/or may be automatically detected by the APC 102 in various manners as desired. As one non-limiting example, providing a mode-changing command such as a wake-up command to the APC 102 may include pressing a physical or virtual button on either the APC 102 or the device 114 and/or moving or changing the position of the APC 102 (hence allowing an on-board accelerometer, gyroscope, compass, or other sensor to register a movement). In other non-limiting examples, the APC 102 may change its operating mode based on a detection of a charged battery, a recognition of a schedule set by a user or other person, and/or a detection of a pressure change on or in the APC 102. Some or all of these commands additionally may be used to change the mode of APC 102 from Off to Normal, and additional techniques may be used to provide a mode-changing command to the APC 102.

Another non-limiting example of a power control activity includes controlling charging operations of the APC 102. As an example, lithium-ion batteries, presently preferred choices for batteries on-board the APC 102 (although the APC 102 could use other types of batteries), may heat to high temperatures when nearing or reaching full charge. Power control of charging operations may reduce the possibility of battery explosion or wear.

In such embodiments for controlling charging operation, the controller of the APC 102 or other suitable control device or system may use various techniques or methods for controlling charging of the batteries of the APC 102. As one non-limiting example, the APC 102 may control itself (e.g., via the controller and/or other managing system) and/or be controlled to stop battery charging at a specific charge level. As another non-limiting example, controlling charging of the APC 102 may include controlling the APC 102 to maintain battery charge at a particular level (less than full charge) if the APC 102 remains connected to a battery charger for an extended period after initially reaching full charge. In another non-limiting example, controlling charging of the APC 102 may include scheduling battery charging according to a preset usage schedule and/or after obtaining information about prior usage, thus allowing charging to occur in a manner causing the battery to be fully charged when APC 102 is next projected or expected to be used. As another non-limiting example, controlling charging of the APC 102 may include controlling the APC 102 to stop charging the battery, or affirmatively load the battery for discharge, when the APC 102 detects overheating of the battery due to charging or to ambient heat conditions. In a further non-limiting example, controlling charging of the APC 102 may include controlling a charging current to modify battery-charging speed. In yet another non-limiting example, controlling charging of the APC 102 may include detecting (by the APC 102 or otherwise) a condition of the battery and communicating the detected status to the external device 114. In such examples, the detected condition of the battery may include, but is not limited to, a missing battery (or a battery that is not present within the APC 102), a short circuit, a low power level, etc. Such detected conditions may be communicated to the device 114 and presented to the user 116 as desired.

Another non-limiting example of a power control activity includes controlling APC 102 performance based on a power level of the batteries. In such embodiments, controlling APC 102 performance may be performed by the controller of the APC 102 or other suitable control device or system. Controlling performance of the APC 102 based on power level may allow the APC 102 to account for declining battery voltage occurring, for example, either during a cleaning cycle or generally over time. A non-limiting example of such control may include managing operating speed(s) of on-board motor(s) of the APC 102 according to battery charge level, as by varying modulation of the pulse width (PWM) of the power signals to the motor(s), for example. Other non-limiting examples of controlling performance of the APC 102 include, but are not limited to, managing cleaning cycle times and patterns according to battery charge level, stopping a cleaning cycle according to battery charge level, declining to initiate a user-requested cleaning cycle because of low battery charge level, and/or proposing a specific cycle time or pattern to a user or other person according to battery charge level.

As mentioned, the above examples of controlled activities should not be considered limiting, and in other embodiments, the APC 102 may control itself and/or be controlled to perform various other activities as desired.

Charging System

Figure 3:
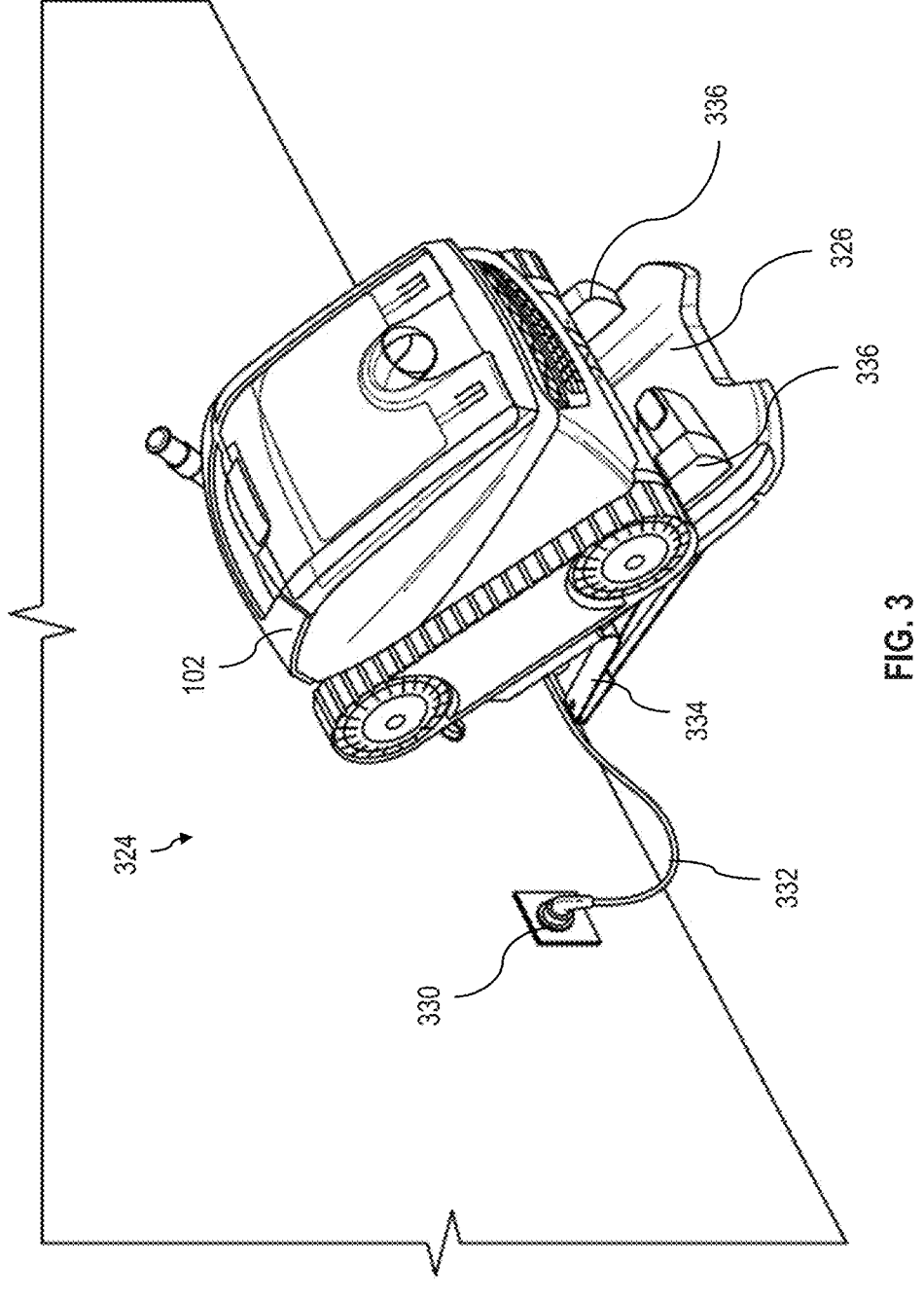
FIG. 3 illustrates the APC of FIG. 1 with a charging station according to embodiments.
Figures 4, 5:
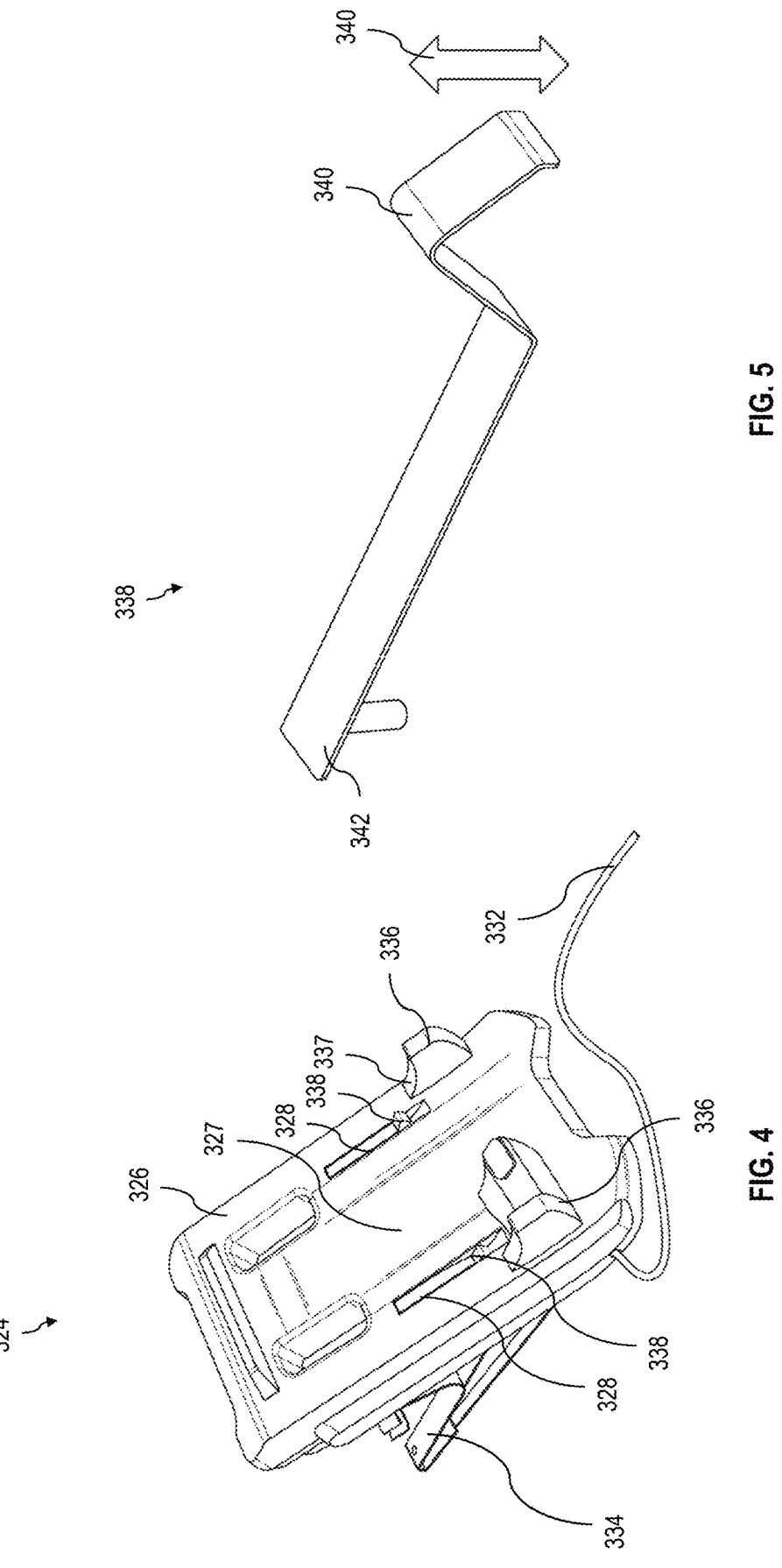
FIG. 4 illustrates the charging station of FIG. 3.
FIG. 5 illustrates a flexible electrical contact of the charging station of FIG. 3.

In embodiments where the APC 102 includes batteries, a charging system or station for selectively charging (or recharging) batteries of the APC 102 may be provided. FIGS. 3-5 illustrate an embodiment of a charging station 324 according to various embodiments.

As best illustrated in FIGS. 3 and 4, the charging station 324 includes a base 326 with a base surface 327 and one or more electrically conductive portions 328. The charging station 324 may be connected to a power source 330 via a cord 332 or other suitable mechanism or device. The power source 330 may be various sources of electrical power as desired such as electrical power, solar power, etc. If available, the charging station 324 may be located in any suitable area relative to the swimming pool 110. The base 326 further may, but need not, include feet 334 such that the base 326 may be freestanding as shown in FIGS. 3 and 4. Optionally, the base 326 may include one or more supports 336 for selectively supporting the APC 102 on the base 326. The one or more supports 336 include a support surface 337. In certain embodiments, the supports 336 may facilitate positioning of the APC 102 on the base 326.

When the APC 102 is positioned on the base 326, the conductive portions 328 may contact conductive pads of the battery block of the APC 102 and/or other contact features on the APC 102. Contact between the conductive portions

328 and the conductive pads allows electricity to flow from the charging station 324 to the batteries within the battery block. In some cases, the conductive pads or other contact features of the APC 102 are located at one end of the APC 102. As shown in FIG. 3, the charging station 324 may be configured so that one end of the APC 102 (e.g., the end with the conductive pads or other contact features) docks at the charging station 324, allowing for storage and charging of the APC 102 after the APC 102 (or a user) positions it on the charging station 324. In this way, no separate or special action is needed to store and/or charge the APC 102. This is in contrast to conventional charging systems where a user is required to bring a connector to the APC 102 to connect the APC 102 with the charging system and then separately store the APC 102.

In some embodiments, the electrically conductive portions 328 are flexible electrical contacts 338 that are movable or adjustable relative to the base 326 (represented by arrow 340 in FIG. 5). Optionally, the conductive portions 328 may be provided in recesses or grooves on the base 326, although they may be provided in other locations on the base 326 as desired. Referring to FIG. 5, in some embodiments the electrical contacts 338 are flexible by having a first portion 342 that may be fixed relative to the base 326 (or more fixed compared to a second portion 344) and the second portion 344 that is not fixed relative to the base 326 (or less fixed compared to the second portion 342). Other techniques may be used as desired. Optionally, the flexible electrical contacts 338 additionally include a spring or other biasing mechanism, which may increase efficiency of contact and better conductivity by providing more force. Moreover, the particular flexible electrical contact 338 illustrated in FIGS. 4 and 5 should not be limiting, and in other embodiments, flexible electrical contacts 338 may have other shapes or profiles as desired, including but not limited to flat, cylindrical, conical, combinations thereof, and/or other profiles or combinations of profiles as desired.

In certain embodiments, the flexible electrical contacts 338 may facilitate contact with a plug or contact pads of the APC 102 and may allow for contact when the APC 102 is in a variety of positions on the base 326. In addition to facilitating contact with the APC 102, the flexible electrical contacts 338 optionally may include a characteristic that changes based on a temperature of the flexible electrical contact. For example, the flexible electrical contacts 338 may function as a thermal fuse that further protects the charging station 324 and the APC 102. As a non-limiting example, the flexible electrical contact 338 may be constructed from a material that expands based on an increase in temperature, which may cause the flexible electrical contact to be reshaped and/or repositioned in a way such that it no longer contacts the APC 102, thus preventing the battery from overheating or subjecting the battery or the charging station 324 to damage or malfunction. As a further non-limiting example, at least one characteristic of the flexible electrical contact 338 may change based on temperature such that physical contact with the flexible electrical contact 338 is prevented or minimized.

While the flexible electrical contacts 338 have been discussed in the context of the base 326 and for purposes of charging the APC 102 (e.g., transferring current), they are by no means limited, and instead the flexible electrical contacts 338 may be provided at other locations for other applications with contact. As a non-limiting example, one or more flexible electrical contacts 338 may be provided on the APC 102 itself, such as external to the APC 102 and/or internal to the APC 102. Moreover, the flexible electrical contacts 338 may allow for the transfer of data and/or magnetic fields between two components in addition to or in place of transferring current.

Figure 7:
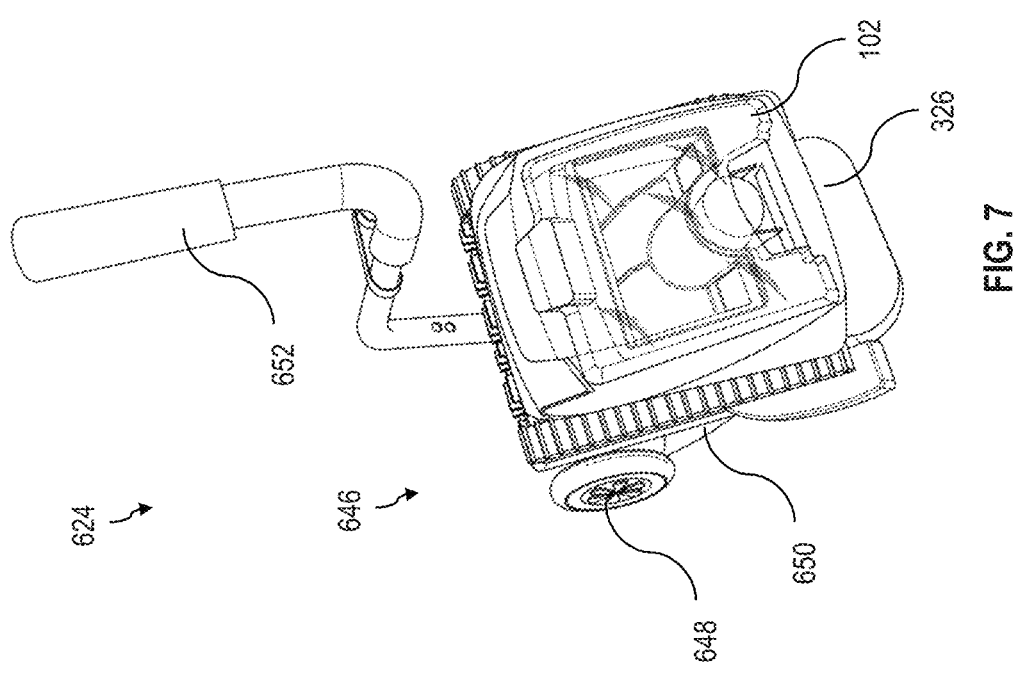
FIG. 7 illustrates the APC of FIG. 1 on the charging station of FIG. 6.
Figure 6:
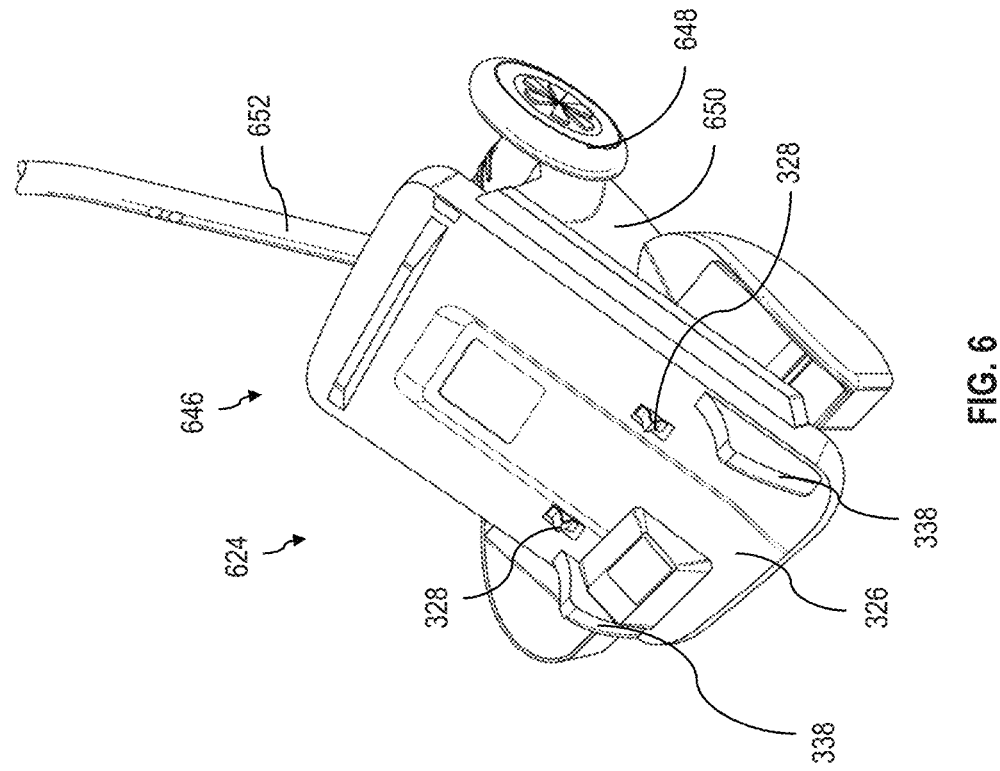
FIG. 6 illustrates another charging station for an APC according to embodiments.

FIGS. 6 and 7 illustrate another embodiment of a charging station 624. The charging station 624 is substantially similar to the charging station 324 except that the charging station 624 is a transport vehicle 646, such as a trolley 650, with one or more motive elements 648, such as wheels, instead of the feet 334. Optionally, the trolley 650 includes a handle 652, although the specific trolley 650 illustrated should not be considered limiting. Wheeled transport vehicles such as the trolley 650 sometimes are used in connection with robotic cleaners such as the APC 102. In the embodiment of FIGS. 6 and 7, the base 326 may be positioned on (or integrated into) the trolley 650 if desired, thus allowing the charging station 624 to be transportable. Moreover, the APC 102 may be positioned on the base 326 while the base 326 is positioned on the trolley 650, so that both the APC 102 and the charging station 624 are transportable together. Of course, the base 326 need not be positioned on the trolley 650, as previously illustrated in FIGS. 3-5, for example.

Other charging stations with charging bases may be utilized in other embodiments. As some non-limiting examples, in other embodiments, a charging station may include one or more of an inductive charging base for charging the APC 102 out of the water of the pool 110, an inductive charging base for charging the APC 102 in the water of the pool 110, an inductive charging base that is integrated into a pool light, and/or a charging base that is supported on a skimmer using a hanging system. Other non-limiting examples of charging stations according to embodiments include a charging station with one or more of a charging base with a generated mechanical movement (e.g., like a turning wheel) caught by the APC 102 to charge it, an inductive charging area under or inside of a pool liner (e.g., vinyl), and/or a charging base in the water of the pool 110 with electrical tight connectors. In some embodiments, the battery may be removable, and optionally the removable battery may be provided on a portion of the APC 102 (e.g., a front of the APC 102) enabling front extraction ability of the battery at the waterline without removing robot from the pool.

In certain embodiments, an APC 102 may be a hybrid robot that may operate using power supplied by the on-board battery and/or a cable supplied to the APC 102. In such embodiments, the APC 102 may include a connector for connecting with the cable. In some embodiments, the cable may include an inductive connector, a magnetic connector, and/or a watertight connector. Optionally, the battery may float on or at the water line, and in such embodiments the cable may connect the battery with the APC 102.

In certain embodiments, various energy extraction techniques and/or mechanisms may be used by a charging station and/or the APC 102. Non-limiting examples of energy extraction for providing power to the APC 102 include, but are not limited to, a solar base of a charging station, a wind base of a charging station, an energy extraction system from skimmer flow or flow outlet, an energy extraction system of pool waves, solar panels on pool cover, and/or a floating cleaner with solar panels.

Exemplary concepts or combinations of features of the invention may include:

A. An automatic swimming pool cleaner (APC) (i) comprising a body and an antenna on, in, or attached to the body and, (ii) using the antenna, is configured to communicate wirelessly with a device external to a swimming pool.

B. An APC configured to communicate wirelessly with a device external to a swimming pool while the APC is operating at or near a waterline of the swimming pool.

C. An APC according to statement B and of the robotic type.

D. A method of causing automatic movement of an APC comprising (i) submerging the APC in water of a swimming pool and (ii) contacting the APC with an object, the contact causing the APC to initiate a cleaning cycle, a retrieval activity or other operation of the APC.

E. An APC comprising an on-board battery and configured to switch between operational modes including (a) an idle mode, (b) an off mode, and (c) a normal mode, with the idle mode allowing the APC to receive certain electronic or mechanical information and the off mode interrupting supply of electricity from the on-board battery to other components of the APC.

F. An APC comprising a system for managing charging of its on-board battery.

G. An APC comprising a system for managing its activities based on an extent to which an on-board battery is charged.

H. A charging system for an APC comprising a charging base configured for use externally of a swimming pool and including means for connection to the APC.

I. A charging system according to statement H further comprising a trolley to which the charging base is attached, into which the charging base is integrated, or onto which the charging base is positioned.

J. An APC comprising a body, an antenna enabling a first type of non-wired communication between the APC with a device external to a swimming pool, and a sensor enabling a second type of non-wired communication with the APC different from the first type of non-wired communication.

K. The APC according to statement J, wherein the antenna is on, in, or attached to the body, and wherein the first type of non-wired communication comprises a wireless communication protocol.

L. The APC according to statement J or K, wherein the sensor is configured to detect at least one of external contact with the APC, movement of the APC, or an orientation of the APC.

M. The APC according to any one of statements J-L, wherein the APC is configured to communicate wirelessly with the device external to the swimming pool while the APC is operating at or near a waterline of the swimming pool.

N. A method of controlling a wireless APC, the method comprising sensing contact of an object with the APC and controlling the APC based on the sensed contact.

O. The method according to statement N, wherein controlling the APC comprises causing the APC to initiate either one or more of a cleaning cycle or a retrieval activity.

P. The method according to statement N or O, wherein the retrieval activity comprises one or more stages of a lift cycle, and wherein the one or more stages of the lift cycle comprise orienting the APC within a pool, climbing of a wall by the APC, and waiting at or near a waterline of the pool by the APC.

Q. The method according to any of statements N-P, wherein controlling the APC comprises at least one of: (i) causing the APC to operate its motor to remain at a waterline of a pool; (ii) causing the APC to float at the waterline of the pool; (iii) causing the APC to finish a cleaning cycle near a structure of the pool; (iv) causing the APC to orient itself; or (v) causing the APC to perform an action based on a predetermined time having elapsed since the sensed contact.

R. The method according any of statements N-Q, wherein sensing contact of the object with the APC comprises sensing at least one of water, a floor of the swimming pool, or a touching or other contact from a user or object.

S. An APC comprising a body and an on-board battery configured to supply electricity to a plurality of components of the APC, the on-board battery configured to switch between operational modes, the operational modes comprising: a normal operational mode; an off operational mode interrupting the supply of electricity from the on-board battery to the plurality of components of the APC; and an idle mode allowing the supply of electricity to at a first component of the plurality of components and interrupting the supply of electricity to at least a second component of the plurality of components.

T. The APC according to statement S, further comprising a sensor, wherein the on-board battery is configured to switch between operational modes based on information from the sensor.

U. The APC according to statement S or T, wherein the sensor comprises at least one of a physical button, a temperature sensor, a gyroscope, a compass, a pressure sensor, an accelerometer, or a charge detection sensor.

V. The APC according to any one of statements S-U, wherein the APC is configured to receive an operation schedule from a user and wherein the on-board battery is configured to switch between operational modes based on the operation schedule.

W. An APC comprising an on-board battery and a charging control system for controlling charging of the on-board battery.

X. The APC according to statement W, wherein the charging control system is configured to stop charging of the on-board battery at a predetermined charge level.

Y. The APC according to statement W or X, wherein the charging control system is configured to control a charging speed by controlling a current of charge.

Z. The APC of any one of statements W-Y, wherein the charging control system is configured to discharge the on-board battery or stop charging of the on-board battery based on a temperature of the on-board battery.

AA. The APC of any one of statements W-Z, wherein the charging control system is configured to schedule charging of the on-board battery based on usage of the APC.

BB. The APC of any one of statements W-AA, wherein the charging control system is configured to discharge the on-board battery to a charge level less than a full charge level based on the on-board battery being at the full charge level and the APC being connected to a charger for a predetermined time.

CC. The APC of any one of statements W-BB, wherein the APC is configured to detect a condition of the battery and communicate the detected status to an external device.

DD. An APC comprising an on-board battery and a control system for controlling activities of the APC based on a charge level of the on-board battery.

EE. The APC according to statement DD, wherein the control system is configured to control a motor speed of a motor of the APC based on the charge level of the on-board battery.

FF. The APC according to statement DD or EE, wherein the control system is configured to control a cleaning cycle of the APC based on the charge level of the on-board battery.

GG. The APC according to any one of statements DD-FF, wherein the control system is configured to control at least one of a cycle time or a cycle pattern based on the charge level of the on-board battery.

HH. The APC according to any one of statements DD-GG, wherein the control system is configured to stop the cleaning cycle based on the charge level of the on-board battery.

II. The APC according to any one of statements DD-HH, wherein, based on a cleaning cycle request from a user, the control system is configured to: decline a cleaning cycle request from a user based on the charge level of the on-board battery; or propose a type of cleaning cycle based on the charge level of the on-board battery.

JJ. A charging system for an APC, the charging system comprising a charging base and a flexible electrical contact for contacting the APC, the flexible electrical contact movable relative to the charging base.

KK. The charging system according to statement JJ, wherein at least one characteristic of the flexible electrical contact changes based on a temperature of the flexible electrical contact.

LL. The charging system according to statement JJ or KK, wherein the flexible electrical contact further comprises a spring element.

MM. The charging system according to any one of statements JJ-LL, wherein the flexible electrical contact is elongated and is at least partially positioned in a recess of the charging base.

NN. A charging system for an APC, the charging system comprising a charging base for at least partially supporting the APC, the charging base comprising means for making an electrical connection with the APC.

OO. The charging system according to statement NN, further comprising a trolley comprising at least one motive element, wherein the charging base is on the trolley.

These examples are not intended to be mutually exclusive, exhaustive, or restrictive in any way, and the invention is not limited to these example embodiments but rather encompasses all possible modifications and variations within the scope of any claims ultimately drafted and issued in connection with the invention (and their equivalents). For avoidance of doubt, any combination of features not physically impossible or expressly identified as non-combinable herein may be within the scope of the invention.

Further, although applicant has described devices and techniques for use principally with APCs, persons skilled in the relevant field will recognize that the present invention conceivably could be employed in connection with other objects and in other manners.

What is claimed is:

1. A charging system for an automatic swimming pool cleaner (APC), the charging system comprising:

(i) a base comprising a first side and a second side, wherein the second side is opposite to the first side, the first side comprising a base surface configured to at least partially contact the APC and support the APC on the base, and wherein the base surface of the base is inclined;

(ii) one or more electrically conductive portions configured to charge or recharge one or more power sources of the APC;

(iii) at least one foot extending outwards from the second side of the base and configured to engage a ground surface; and (iv) at least one support extending away from the first side of the base, the at least one support configured to contact the APC.

2. The charging system of claim 1, wherein the one or more electrically conductive portions comprises a flexible electrical contact, and wherein at least one characteristic of the flexible electrical contact changes based on a temperature of the flexible electrical contact.

3. The charging system of claim 1, wherein the one or more electrically conductive portions comprises a flexible electrical contact, and wherein the flexible electrical contact further comprises a spring element.

4. The charging system of claim 1, wherein the one or more electrically conductive portions comprises a flexible electrical contact, and wherein the flexible electrical contact is elongated and is at least partially positioned in a recess of the base.

5. A charging system for an automatic swimming pool cleaner (APC), the charging system comprising:

a base with:

a base surface, wherein the base surface is inclined and configured to at least partially support and orient the APC on the base such that one end of the APC is elevated relative to an opposing end of the APC;

at least one foot extending outwards from the base, the at least one foot configured to engage a ground surface; and a support extending outwards from the base and configured to contact the APC; and one or more electrically conductive portions for making an electrical connection with the APC for charging or recharging one or more power sources of the APC while the APC is on the base.

6. The charging system of claim 5, further comprising a trolley comprising at least one motive element, wherein the base is on the trolley.

7. The charging system of claim 5, wherein the one or more electrically conductive portions comprise one or more electrical contacts.

8. The charging system of claim 7, wherein the one or more electrical contacts comprise a first portion that is fixed relative to the base and second portion which is movable relative to the base, and wherein the first portion is flat.

9. The charging system of claim 7, wherein the one or more electrical contacts comprise a flat profile, a cylindrical profile, or a conical profile.

10. A charging system for an automatic swimming pool cleaner (APC), the charging system comprising:

a base configured to at least partially support the APC on the base, wherein the APC comprises a body and one or more motive elements, wherein the base comprises:

(i) one or more electrically conductive portions for charging or recharging one or more power sources of the APC;

(ii) an inclined base surface configured to support the body of the APC on the base;

(iii) at least one foot extending outwards from the base, the at least one foot configured to engage a ground surface; and (iv) one or more supports extending away from the base surface and configured to contact the APC.

11. The charging system of claim 10, wherein the one or more electrically conductive portions comprise one or more electrical contacts.

12. The charging system of claim 11, wherein the one or more electrical contacts comprise a first portion that is fixed relative to the base, and wherein the first portion is flat.

13. The charging system of claim 10, wherein the one or more electrically conductive portions are on the inclined base surface.

14. The charging system of claim 10, wherein, while the APC is on the base, the one or more supports and the inclined base surface support the APC such that the APC is elevated off a ground on which the base is positionable.

15. The charging system of claim 14, wherein the one or more supports comprise a non-planar surface configured to engage the APC.

16. A charging system comprising:

an automatic swimming pool cleaner (APC), wherein the APC comprises:

a body;

one or more motive elements; and one or more cleaning elements; and a charging station comprising:

a base with an inclined base surface;

one or more supports;

at least one foot extending outwards from the base, wherein the at least one foot is configured to engage a ground surface; and one or more electrically conductive portions for charging or recharging one or more power sources of the APC, wherein the one or more supports extend outwards relative to the inclined base surface, and wherein the APC is positionable on the charging station such that (i) the inclined base surface and the one or more supports contact the APC and (ii) the APC is elevated off the ground surface.

17. The charging system of claim 16, wherein the one or more electrically conductive portions is on the inclined base surface.

18. The charging system of claim 16, wherein the one or more electrically conductive portions comprises at least one electrical contact with a flat profile.

19. The charging system of claim 18, wherein the at least one electrical contact is on the inclined base surface.

20. The charging system of claim 18, wherein the one or more supports and the inclined base surface support the body of the APC.

* * * * *